C. Kaiser.

Needle Machine.

Nº 33,707.

Patented Nov. 12, 1861.

Witnesses:
R. W. McClellan
W. D. Benman

Inventor:
Charles Kaiser

C. Kaiser.
Needle Machine.
Nº 2,703.
33,707.
Patented Nov. 12, 1861.
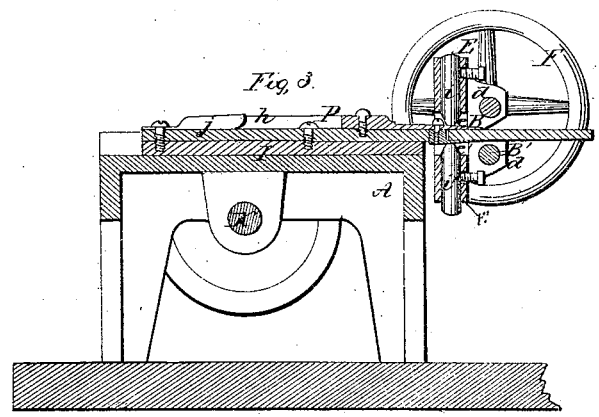
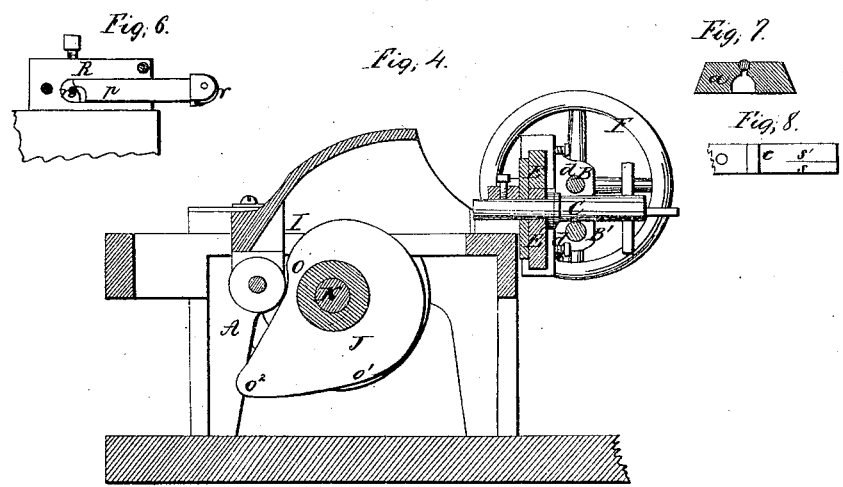
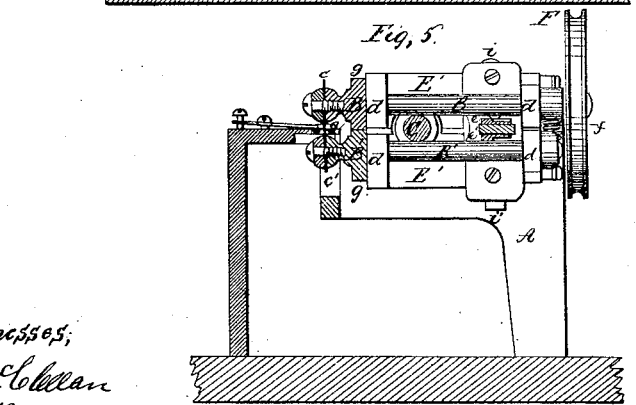
Witnesses:
R. W. McClellan
W. D. Bennem
Inventor,
Charles Kaiser

UNITED STATES PATENT OFFICE.

CHARLES KAISER, OF NEW YORK, N. Y.

IMPROVEMENT IN MACHINERY FOR MAKING NEEDLES.

Specification forming part of Letters Patent No. 33,707, dated November 12, 1861.

*To all whom it may concern:*

Be it known that I, CHARLES KAISER, of the city, county, and State of New York, have invented certain new and useful Improvements in Machinery for Making Needles; and I do hereby declare that the following is a full, clear, and exact description of the same, reference being had to the accompanying drawings, in which—

Figure 1:
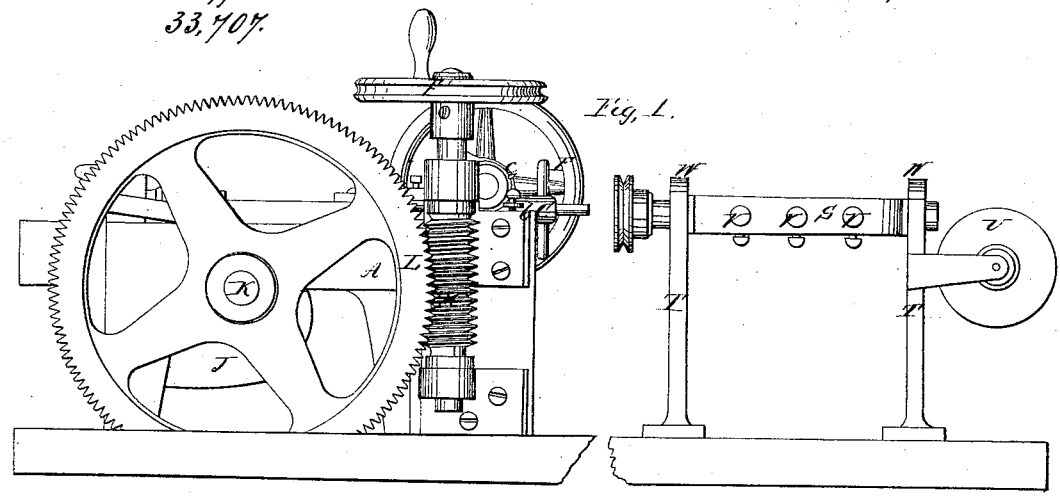
Figure 2:
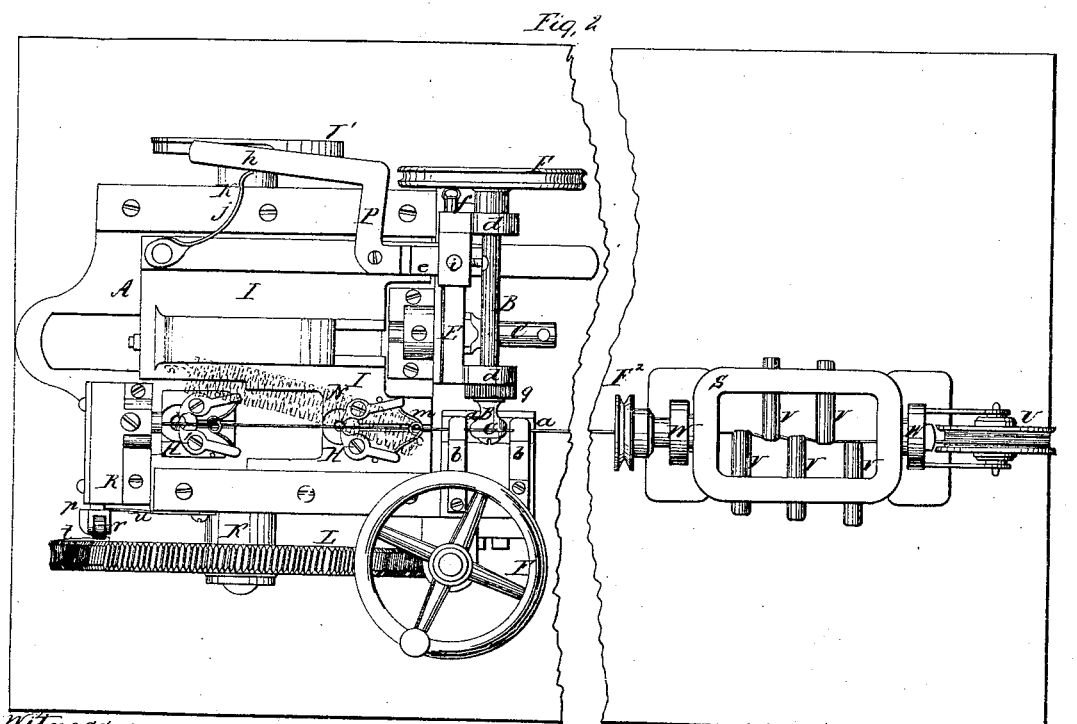

Figure 1 represents a side elevation of a machine embodying all parts of my invention. Fig. 2 represents a plan of the same. Fig. 3 represents a longitudinal section of a portion of the machine at the line $x$ $x$ of Fig. 2. Fig. 4 represents a longitudinal section of the same at the line $y$ $y$ of Fig. 2. Fig. 5 represents a transverse section of a part of the machine at axes of the grooving-saws, a portion of the mandrels of the saws being shown in elevation. Fig. 6 represents an elevation of the hinder side of the knives of the machine with the cap-plate removed. Fig. 7 represents a cross-section of the block of the needle-rest of double the actual dimensions.

The object of my invention is to cut the grooves in needles, and particularly those which are used in sewing-machines, with speed and accuracy.

To this end the first part of my invention consists in a combination of the following members constituting a machine for cutting the groove in the needle-wire, viz: a rest for the needle-wire, a rotating circular saw so mounted with reference to the rest that the saw can be caused to approach the center of the needle-wire and recede therefrom, a traveling forceps to convey the needle-wire past the saw, mechanism to cause the saw to approach and recede from the axis of the needle-wire and to hold it in place, the whole combined together in such manner that the saw is caused to cut into the needle-wire the requisite depth at the place where the groove is to be made and to permit the wire to pass by the saw uncut by the saw where there is to be no groove.

The object of the second part of my invention is to enable the two grooves on the opposite sides of the same needle to be cut during one passage of the needle-wire through the machine; and it consists in the combination of the before-enumerated members with a second rotating saw and mechanism for causing the second saw to approach and recede from the axis of the needle-wire.

The object of the third part of my invention is to permit the needle-wire to be grooved at suitable intervals for forming needles before it is cut up into lengths; and it consists in combining the first part of my invention with a stationary forceps or holder which holds the needle-wire while the movable forceps retrogrades to seize a new length thereof.

The object of the fourth part of my invention is to groove the needle-wire and cut it up into needle-blanks at one continuous operation; and it consists in combining the third part of my invention with a pair of knives in such manner that the grooved needle-wire is cut at the proper intervals into grooved needle-blanks.

The object of the fifth part of my invention is to groove needle-wire drawn directly from the coil; and it consists in combining the first part of my invention with a support for the wire and with mechanism for straightening the wire, this last being located between the support and the grooving mechanism, so that the wire is drawn from the coil through the straightening mechanism into the grooving mechanism.

The third, fourth, and fifth parts of my invention may be combined with the second part thereof. The fifth part thereof may also be combined with the third and fourth parts thereof. I prefer to combine all parts of my invention in the same machine, and the machine represented in the accompanying drawings embodies them all, receiving the needle-wire in the coil and delivering it straightened, grooved on both sides to the required length and depth and cut into needle-blanks of the required length.

The parts of the machine which groove the needle-wire and cut it into lengths are secured to the same frame A and constitute a machine which may be used separately from the straightening mechanism. The rest for sustaining the needle-wire is located at the front end of this frame and consists of a block $a$ of steel grooved longitudinally to prevent the needle-wire that lies in the groove from escaping laterally, and of a pair of spring-fingers $b$ $b$, that extend crosswise over the groove in the block and hold the needle-wire in that groove.

As the machine represented embodies the second part of my invention, it contains two circular saws c c', one of which is above the rest and operates upon the upper side of the needle-wire, while the other is below the rest and operates upon the lower side of the needle-wire, and the grooved block is slotted from its under side upward into the groove to permit the rim of the lower saw to rise and act upon the under side of the needle-wire. Each of the circular saws is mounted upon a separate mandrel B and B', and each saw-mandrel is fitted to revolve in boxes d d, which form part of a vibrating mandrel-holder. The two mandrel-holders E and E' are pivoted at a point between their boxes upon a center pin C, secured to the frame of the machine, so that by separating their extremities which are farthest from the saws the edges of the latter are caused to approach the axis of the needle-wire supported in the groove of the rest, while by drawing their said extremities together the saws are caused to recede from the needle-wire. The drawing of the extremities of the mandrel-holders together is effected by a spring f, and the separation of them is effected by cam-plates in a manner hereinafter described. The upper saw-mandrel is fitted with a pulley F, to which a belt is applied to cause the saw to rotate rapidly, and the two saw-mandrels are geared together by toothed pinions g g, so that when one rotates the other is caused to rotate in the opposite direction.

The traveling nippers by which the needle-wire is conveyed through the machine consists of a pair of spring-nippers H, secured to a sliding carriage I. The jaws of the nippers are pressed toward each other by a spring m, and they are prevented from getting out of the line of the needle-wire by means of stop-pins secured to the carriage. The jaws are of such form that when drawn toward the circular saws they open of themselves and glide over the needle-wire, but when carried from the circular saws they indent themselves into the wire and carry it with them. The nipper-carriage I is constructed to slide in dovetailed ways longitudinally toward and from the grooving-saws. It is moved from the grooving-saws by means of a cam J, that is secured to a revolving shaft K, supported in boxes beneath the nipper-carriage. This cam-shaft is fitted at one extremity with a screw-wheel L, which is driven by a screw M, to which a rotary motion is imparted by means of a belt applied to a belt-pulley F', secured to one end of the screw-shaft. The cam operates upon a friction-wheel secured to the carriage, and is of such form that after pushing the carriage and the nippers thereon from the grooving-saws during a part of its revolution it permits the carriage, with the nippers, to be drawn back to the place whence it started by the operation of a spring N, (shown in dotted lines in Fig. 2,) which is connected at one end with the bracket of the friction-wheel of the carriage and at the other end with the frame of the machine. The total distance to which the carriage is moved by the cam is equal to the length of the needle-blanks to be made.

In order that each saw may approach the axis of the needle-wire at the proper time to commence cutting the groove, may continue in its position while the needle-wire is drawn along by the nippers the length of the groove, and may recede from the axis of the needle-wire when the groove is completed, the cam-plates which control the movements of the saws are connected with a bar that projects from the nipper-carriage between the mandrel-holders and is moved by that carriage.

As there are two saws used in the machine under consideration, and as each has to cut a groove of a certain size differing from that cut by the other, two cam-plates e e' are used, each of which acts upon a pin secured to one of the mandrel-holders. The pins i i', upon which the cam-plates act, are secured by pinch-screws in sockets in those extremities of the mandrel-holders which are farthest from the saws, so that the projection of their ends from the sockets can be adjusted. The cam-plate e is provided to act upon the pin of the upper mandrel-holder, and the cam-plate e' is provided to act upon the pin of the lower mandrel-holder. The upper cam-plate forms the front end of a lever P, which is pivoted to the nipper-carriage and has a tail h, which projects at the side thereof within range of a face-cam J', that is secured to the one extremity of the cam-shaft K, and is borne against that cam by a spring j. The cam-plate has two grades upon it, which are drawn in contact with the pin alternately, according to the position of the cam-plate as determined by the cam J'. One of these grades s, Fig. 8, is of the proper form and proper length to hold the saw depressed the depth of the groove in the needle while the needle-wire is conveyed along the length of the groove to be cut, and the cam J', that acts upon the cam-plate lever, is of such form and so timed with reference to the nipper-carriage cam that this grade is drawn along in contact with the pin i until the end of the grade has passed beyond the pin. As soon as the end of this grade is carried by the nipper-carriage past the end of the pin against which it bears the mandrel, being no longer controlled by the cam-plate, is turned by its spring f to raise the saw out of contact with the needle-wire. The other grade s', Fig. 8, is inclined, its front end being the lowest and its hinder end being on a level with the first grade s, and the cam J', that controls the cam-plate, is made of such form and is so timed with reference to the cam J of the nipper-carriage that the cam-plate lever P is turned by the spring j after the first grade s has passed the pin i of the mandrel-holder to move the inclined grade within the line of that pin. Hence when the nipper-carriage retrogrades that pin is acted upon by the inclined grade and the upper saw controlled thereby is gradually depressed into the needle-wire which is then at rest. When the nipper-carriage cam reaches the forward position whence it started, the cam J' turns the cam-plate lever P to shift the first grade s again under the pin i of the mandrel-holder, so that this grade is in the proper position when the nipper-carriage again conveys the needle-wire under the grooving-saw.

The cam-plate e' of the lower mandrel-holder is connected by pins with the cam-plate of the upper mandrel-holder, so as to be controlled by the same cam J'. This lower cam-plate has two grades like those of the upper one; but as the groove in the side of the needle upon which the lower saw acts is much shorter than the opposite groove the grade that is in contact with the pin i' of the lower mandrel-holder during the conveyance of the needle-wire past the grooving-saws is of a length only sufficient to keep the lower saw cutting in the needle-wire the required length of the groove.

During the operation of cutting the grooves the needle-wire can be moved only so fast as the speed at which that operation can be effected successfully, and the cam J, that operates the nipper-carriage, is of the proper form from o to o' to move the latter with an equable movement and at a suitable speed during this operation. After this operation is completed the needle-wire may be moved much more rapidly to draw the length of wire that corresponds with the ungrooved shank of the needle through the machine, and as such more rapid movement increases the product of the machine the cam J, that moves the carriage, is formed with a more rapid eccentricity from o' to o², so that it completes the movement of the carriage as fast as possible after the saws have completed the grooves. After the carriage has been moved by the cam to convey one length of needle-wire past the saws the carriage is caused to retrograde by the spring N to enable the traveling nippers to seize upon a new length of wire, which is in turn conveyed past the saws. During the retrograde movement of the traveling nippers the needle-wire is held at rest by a pair of stationary nippers H', which are in all respects like the traveling nippers and are secured to the frame of the machine. Immediately beyond these stationary nippers are the shears by means of which the grooved needle-wire is severed into lengths. These shears consist of a fixed blade or die n, secured in a socket in the frame of the machine, and of a movable blade that is secured in a piston p, which is pushed at the proper moment past the fixed blade. The piston p moves in a slide-box. It is fitted at its outer end with a friction-wheel r, which is acted upon by a wedge-block t, secured to the screw-wheel L. It is also fitted with a spring u, which moves it outward in its slide-box, thus withdrawing the movable from the fixed shear-blade when the wedge-block passes by the friction-roller of the piston, so that as the nippers draw one length of wire through the machine a preceding length is pushed between the open shears. The position of the wedge-block on the screw-wheel is such that the severing of the grooved needle-wire takes place when the nipper-carriage is retrograding and the wire is at rest, and the distance of the cutting-edges of the shears from the saws is such that the needle-wire is severed at the proper point between the grooves to leave a shank upon one part and enough length to form the point upon the other part of the wire.

The straightening mechanism and the support for the coil of wire are located in advance of the grooving mechanism, and I have found by practice that the machine operates well when the distance between the two is about three feet. The straightening mechanism consists, in this instance, of a set of revolving pins, past whose points the wire is drawn. The pins v are secured to a frame S, which is fitted with a pair of tubular journals through which the wire passes. These journals are supported in suitable boxes w, secured to standards T, and one of them is fitted with a pulley F², to which the belt is applied by which the pins are caused to revolve. The ends of the pins are grooved to keep the wire in its place, and the pins are secured to the revolving frame by means of pinch-screws that permit them to be adjusted as required. The support for the coil of wire is secured to one of the standards of the straightening mechanism, and consists, in this instance, of a reel U, on which the coil of wire is placed.

In making the rests for the needle-wire while under the action of the saws I prefer to make a part of the groove for about a quarter of an inch on each side of the axis of the saws of the section, (shown in an enlarged scale in Fig. 7,) so that the upper part of the wire is overlapped by the lips of the groove. A special grooved block should be provided for each size of needle-wire to be operated upon, and the form and thickness of the edge of the saws should be adapted to the form and size of the groove to be cut.

The first and second parts of my invention may be used to groove needle-wire previously cut into lengths, in which case the needle-blanks should be entered one at a time into the groove of the rest, and a movable stop should be employed to limit the distance to which they are entered.

In putting the machine into operation I find it advantageous to cover the saw with the oily chips of preceding operations, or with some oily iron filings to keep the saws properly lubricated. I find it also advantageous to locate a clamp with faces of india-rubber between the straightening mechanism and the grooving mechanism, so as to prevent the wire from vibrating as it enters the grooving mechanism. The clamps should be located within about nine inches of the grooving mechanism. A convenient size for the grooving-saws is one inch in diameter.

The belts which drive the saws, the screw-shaft, and the straightening-machine may all be connected with pulleys secured to the same counter-shaft. A convenient speed for the saws is about two hundred and sixty-six per minute, and for the straighteners about two hundred and forty-six per minute. The screw-shaft M, that drives the cam-shaft K, may be driven so as to make the nipper-carriage make three movements in each direction per minute. These speeds may, however, be varied, and the construction and arrangement of the mechanism may also be varied as circumstances render expedient. In case the needle-wire is in lengths, instead of in coils, a suitable support may be used in place of a reel.

Having thus described a machine embodying my improvements, what I claim as my invention, and desire to secure by Letters Patent, is—

1. The combination of the following members, constituting a machine for grooving needle-wire, viz: a rest for the needle-wire, a rotating grooving-saw, a traveling forceps, and mechanism to cause the saw to approach and recede from the axis of the needle-wire and to hold it in place, the combination, as a whole, being and operating substantially as described.

2. In combination with the above-enumerated members, a second rotating grooving-saw and mechanism to cause the saw to approach and recede from the axis of the needle-wire and to hold it in place, substantially as set forth.

3. The combination of the first part of my invention with a stationary forceps or holder, substantially as herein set forth.

4. The combination of the third part of my invention with a pair of knives in such manner that the grooved needle-wire is cut at the proper intervals into grooved needle-blanks, substantially as set forth.

5. The combination of the first part of my invention with a support for the needle-wire and with a straightening mechanism, substantially as described.

In testimony whereof I have hereunto subscribed my name.

CHARLES KAISER.

Witnesses:
R. W. McClellan,
W. L. Bennem.